(12) United States Patent
Grip et al.

(10) Patent No.: US 11,254,413 B2
(45) Date of Patent: Feb. 22, 2022

(54) SPATIALLY STAGGERED JURY STRUT SYSTEM

(71) Applicant: THE BOEING COMPANY, Chicago, IL (US)

(72) Inventors: Robert Erik Grip, Rancho Palos Verdes, CA (US); Max U. Kismarton, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 246 days.

(21) Appl. No.: 16/601,245

(22) Filed: Oct. 14, 2019

(65) Prior Publication Data

US 2021/0107622 A1   Apr. 15, 2021

(51) Int. Cl.
*B64C 7/00* (2006.01)
*B64C 1/26* (2006.01)

(52) U.S. Cl.
CPC . *B64C 7/00* (2013.01); *B64C 1/26* (2013.01)

(58) Field of Classification Search
CPC ...... B64C 7/00; B64C 1/26; B64D 2045/0095
See application file for complete search history.

(56) References Cited

U.S. PATENT DOCUMENTS

| 1,605,036 A | 11/1926 | Junkers |
| 1,965,185 A | 7/1934 | Gwinn, Jr. |
| 2,603,435 A | 7/1952 | Metzler |
| 2016/0001874 A1* | 1/2016 | Pitt ........................... B64C 3/16 244/174 |
| 2018/0086449 A1* | 3/2018 | Sarigul-Klijn ......... B64D 17/80 |
| 2018/0281922 A1* | 10/2018 | Sclafani .................... B64C 3/14 |
| 2018/0281926 A1* | 10/2018 | Sclafani .................... B64C 3/16 |
| 2019/0291846 A1* | 9/2019 | Harrison ................. B64C 23/04 |
| 2019/0300143 A1* | 10/2019 | Harrison ................... B64C 3/14 |
| 2021/0179257 A1* | 6/2021 | Tsai .......................... B64C 3/50 |

OTHER PUBLICATIONS

European Search Report for EP Application No. 20192411 dated Feb. 9, 2021.
Written Opinion for EP Application No. 20192411.5 dated Feb. 9, 2021.

* cited by examiner

*Primary Examiner* — Rodney A Bonnette
(74) *Attorney, Agent, or Firm* — Marshall, Gerstein & Borun LLP

(57) ABSTRACT

A strut system for a wing of an aircraft, includes a strut member extending from the wing and a first jury strut assembly associated with the wing. The first jury strut assembly includes a first jury strut, which has a first end connected to the strut member and a second jury strut, which has a first end connected to the strut member, wherein a second end of the first jury strut and a second end of the second jury strut are each connected to the wing spaced apart from one another in a direction of a chord.

20 Claims, 11 Drawing Sheets

SPATIALLY STAGGERED JURY STRUT SYSTEM

FIELD

This disclosure relates to a strut member for a wing of an aircraft and more particularly to a strut member which includes jury strut support.

BACKGROUND

Wings of an aircraft having strut member support provides the aircraft weight and drag advantages compared to wings that do not have strut member support. The strut member reduces a bending moment at the wing root, where the wing attaches to the fuselage. With the aircraft in operation, a strut member example, which includes the strut member connected to the fuselage of the aircraft and connected to the underside of the wing, generally experiences tension loading and with the aircraft on the ground the strut member experiences compression loading. This is a most commonly used configuration because interference drag at the strut-wing connection is less severe on the lower surface of the wing compared to the upper surface of the wing. In an example of load conditions for certification of an aircraft, by the Federal Aviation Administration ("FAA"), include satisfying a negative 1.0 g pushover flight condition for the aircraft, wherein the strut is connected, in this example, to a lower surface of the wing. The 1.0 g pushover condition places a strut member, with the strut connected to the lower surface of the wing, in compression. In compression loading in order to increase a buckling load capability of the strut member without increasing the strut member cross section, it is advantageous to utilize one or more jury struts per side of the aircraft to break up the buckling length of the strut member into smaller segments along the length of the strut member. The segmenting of the strut member length, with employment of jury strut(s) fastened along the length of the strut member and substantially normal to an axis of the strut member and substantially aligned such that the jury strut(s) provides support to the strut member in the bending plane associated with the weaker moment of inertia and enhances the buckling load capability of the strut member in accordance with Euler Column formulation.

Aircraft are designed to overcome what is referred to as discrete source damage events. One category of discrete source damage events is an engine rotor burst. In the occurrence of an engine rotor burst, a rotor of an aircraft engine separates into multiple fragments and exits the engine casing at a high velocity. In an analysis of engine rotor burst events, analysts have assumed fragments from engine rotor burst events to have infinite energy and the size and shape of the fragment(s) is assumed to be that of one-third segment of the rotor. The exit path of the fragment(s) from the engine is assumed to be in any direction within three hundred and sixty degrees (360°) about and in a plane of the spinning rotor of an engine. In a top plan view of an aircraft, analysts have assumed fragment(s) originating from the engine rotor will travel within a bounds of a plane of five degrees (5°) inclined on either side of a plane extending perpendicular to the axis of the spinning rotor. In addition, a width dimension of the fragment(s) can vary based on a particular aircraft engine which is being used. The width dimension has been selected by analysts to be as small as a couple of inches up to as much as a foot or more. There is a need to preserve substantial performance capabilities of structural components of the aircraft upon the occurrence of an engine rotor burst event, such as jury struts, which provide needed support to the strut member and in turn, the wing.

As a result, there is a need to provide jury strut designs that will contribute to safe operation of the aircraft upon an occurrence of an engine rotor burst event and sustain needed buckling load resistance for the strut member. In addition, there is a need to provide a jury strut design that will optimize jury strut performance for the aircraft upon an occurrence of a bird strike with respect to jury struts.

SUMMARY

An example includes a strut system for a wing of an aircraft which includes a strut member extending from the wing and a first jury strut assembly associated with the wing. The first jury strut assembly includes a first jury strut, which has a first end connected to the strut member and a second jury strut, which has a first end connected to the strut member, wherein a second end of the first jury strut and a second end of the second jury strut are each connected to the wing spaced apart from one another in a direction of a chord.

Another example includes a method for installing a strut system for a wing of an aircraft, which includes securing a strut member to the wing of the aircraft and to a fuselage of the aircraft and connecting a first jury strut assembly to the wing and to the strut member. The method further includes connecting a first end of a first jury strut to the strut member, connecting a first end of a second jury strut to the strut member; and connecting a second end of the first jury strut and a second end of the second jury strut to the wing spaced apart from one another in a direction of a chord.

The features, functions, and advantages that have been discussed can be achieved independently in various embodiments or may be combined in yet other embodiments further details of which can be seen with reference to the following description and drawings.

DESCRIPTION

Figure 1:
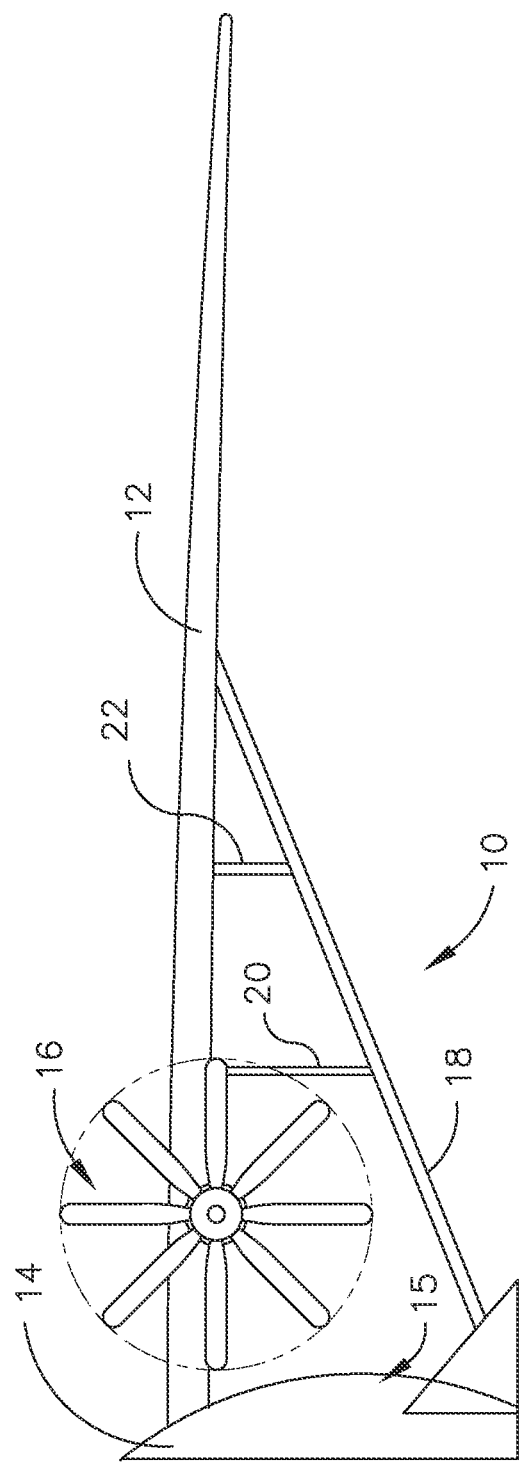
FIG. 1 is a partial front elevation schematic view of a turboprop aircraft with a wing supported with a strut member and jury struts of the prior art.

Wings of an aircraft which have strut member support, provide the aircraft operational weight advantage compared to wings that do not have strut member support. Strut members greatly reduce the bending moment at the wing root, where the wing attaches to the fuselage. With the aircraft in operation, the strut member generally experiences tension loading and with the aircraft on the ground, the strut member experiences compression loading. In an example of load conditions for certification of an aircraft by the Federal Aviation Administration ("FAA") includes satisfying a negative 1.0 g pushover flight condition for the aircraft, wherein the strut member is connected, in this example, to a lower surface of the wing. The 1.0 g pushover condition places a strut member, with the strut member connected to the lower surface of the wing, in compression. In compression loading in order to increase the buckling load capability of the strut member, without increasing the strut member cross section, it is advantageous to utilize one or more jury struts per side of the aircraft to break up the buckling length of the strut member into smaller segments along the length of the strut member. Jury struts are positioned fastened along the length of the strut member and substantially normal to an axis of the strut member and substantially aligned such that the jury strut provides support to the strut member in the bending plane associated with the weaker moment of inertia and enhances the buckling load capability of the strut member in accordance with the Euler Column formulation as mentioned earlier.

Aircraft are designed to overcome what is referred to as discrete source damage events. One category of discrete source damage events is what is referred to as an engine rotor burst. In an engine rotor burst event, analysts findings have ascertained a rotor of the engine separates into multiple fragments and exits the engine casing at a very high velocity. In an analysis of engine rotor burst events, analysts have assumed for this analysis rotor fragments have infinite energy and the rotor fragments and the size and shape of the fragment(s) is assumed to be that of one-third segment of the rotor. The fragment(s) will follow an exit path anywhere about three hundred and sixty degrees (360°) of the spinning rotor is a plane of the spinning rotor and the fragments will travel within the bounds of a plane five degrees (5°) inclined on either side of a plane extending perpendicular to the axis of the spinning rotor. A width of the rotor varies with respect to what engine is being used, however, in many instances, the analysts are comfortable with approximating the width of the rotor to be a couple of inches up to approximately twelve (12.0) inches in width, however, this width can vary as engine design and corresponding rotor designs vary in size.

As a result of analyst findings and assumptions made, a path of a fragmented part of a rotor of an engine is a concern for preserving the performance capabilities of jury struts in supporting the wing upon an occurrence of an engine rotor burst event. The present disclosure addresses arrangement of positioning jury struts so as to optimize operational wing support upon an occurrence of an engine rotor burst event in accordance with the analysts' findings and assumptions made with respect to an engine rotor burst event. In addition, the disclosure addresses arrangement of positioning of jury struts so as to optimize operational wing support upon an occurrence of a bird strike, wherein analysts have included separation or spacing of jury struts to include a couple of inches up to at least twelve inches (12") of separation in a span wise direction along the wing of the aircraft.

Figure 2:
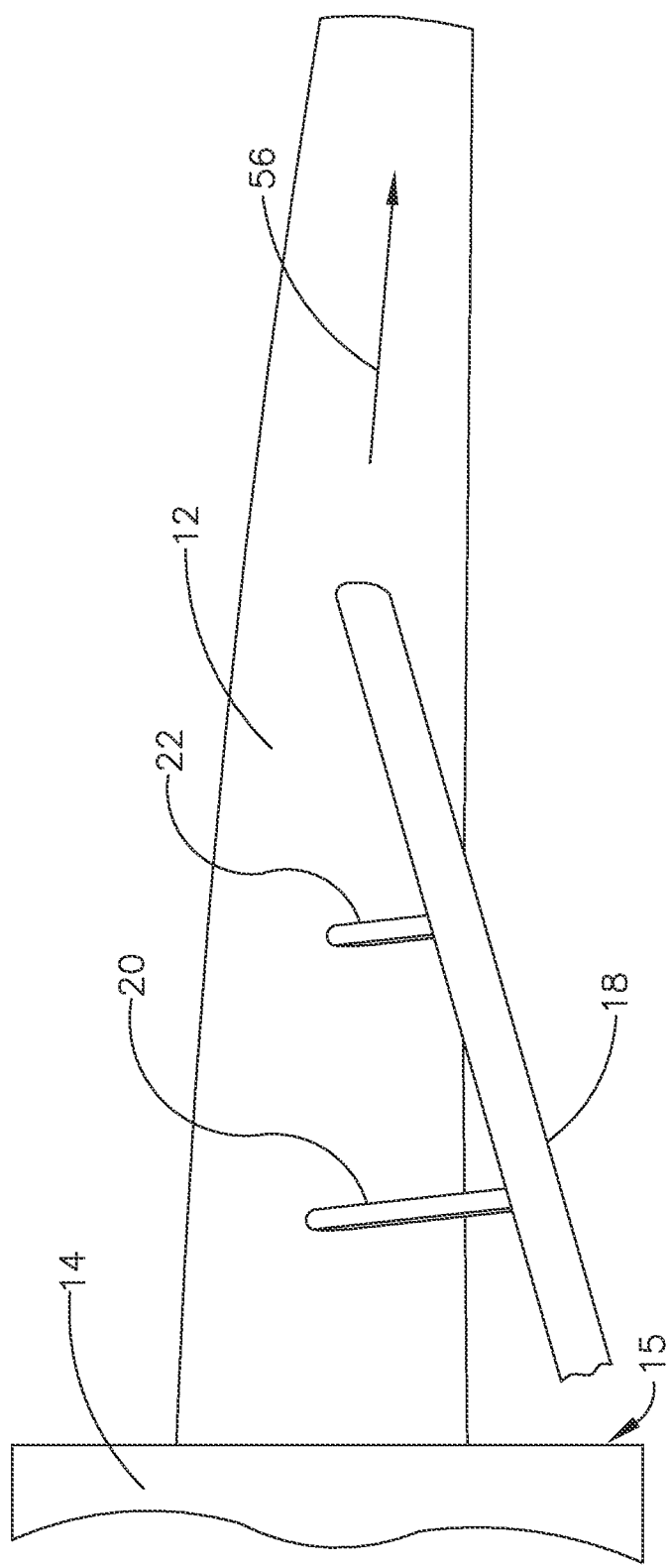
FIG. 2 is a perspective view from under the wing of FIG. 1.

As shown in FIGS. 1 and 2, a prior art strut system 10, is shown for wing 12 of aircraft 14 having a turboprop engine 16. In strut system 10, strut member 18 secures to wing 12 and extends to and connects to fuselage 15 of aircraft 14 providing generally tension loading support during aircraft 14 operations and compression loading support with aircraft 14 on the ground. Jury struts 20 and 22 are connected to strut member 18 and to wing 12 providing improved buckling load support for strut member 18. However, with the positioning of jury struts 20 and 22, jury struts 20 and 22 are vulnerable to an engine rotor burst event with a fragment traveling in a direction of aligned, along span wise direction 56 of jury struts 20 and 22, as seen in FIG. 2, which could potentially result in severely damaging both jury struts 20 and 22 with a single fragment and eliminating the support provided by jury struts 20 and 22. In addition, with the arrangement of jury struts 20 and 22, a single bird strike on each of jury struts 20 and 22 can create loss of acceptable buckling load support for strut member 18.

Figure 3:
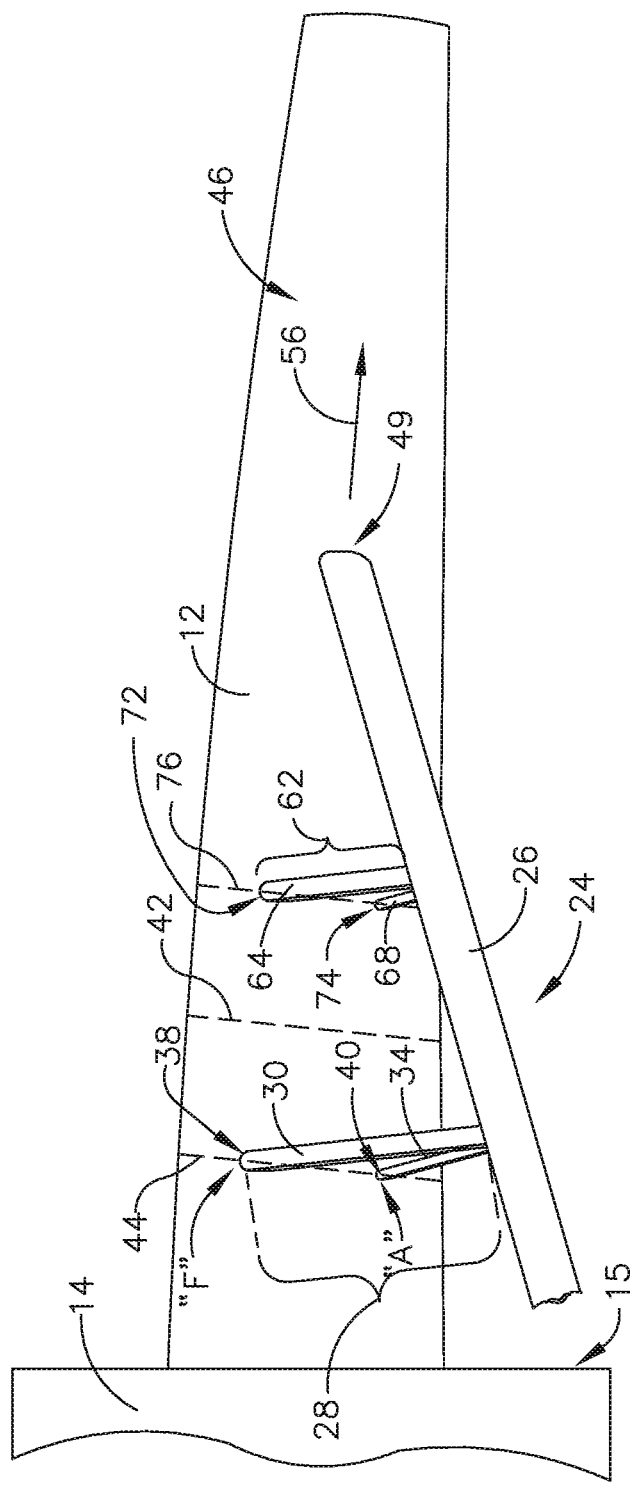
FIG. 3 is a perspective view from under the wing of the turboprop aircraft showing a first example of a first jury strut assembly (inboard on wing) and a first example of a second jury strut assembly (outboard on wing) of the present disclosure.
Figure 4:
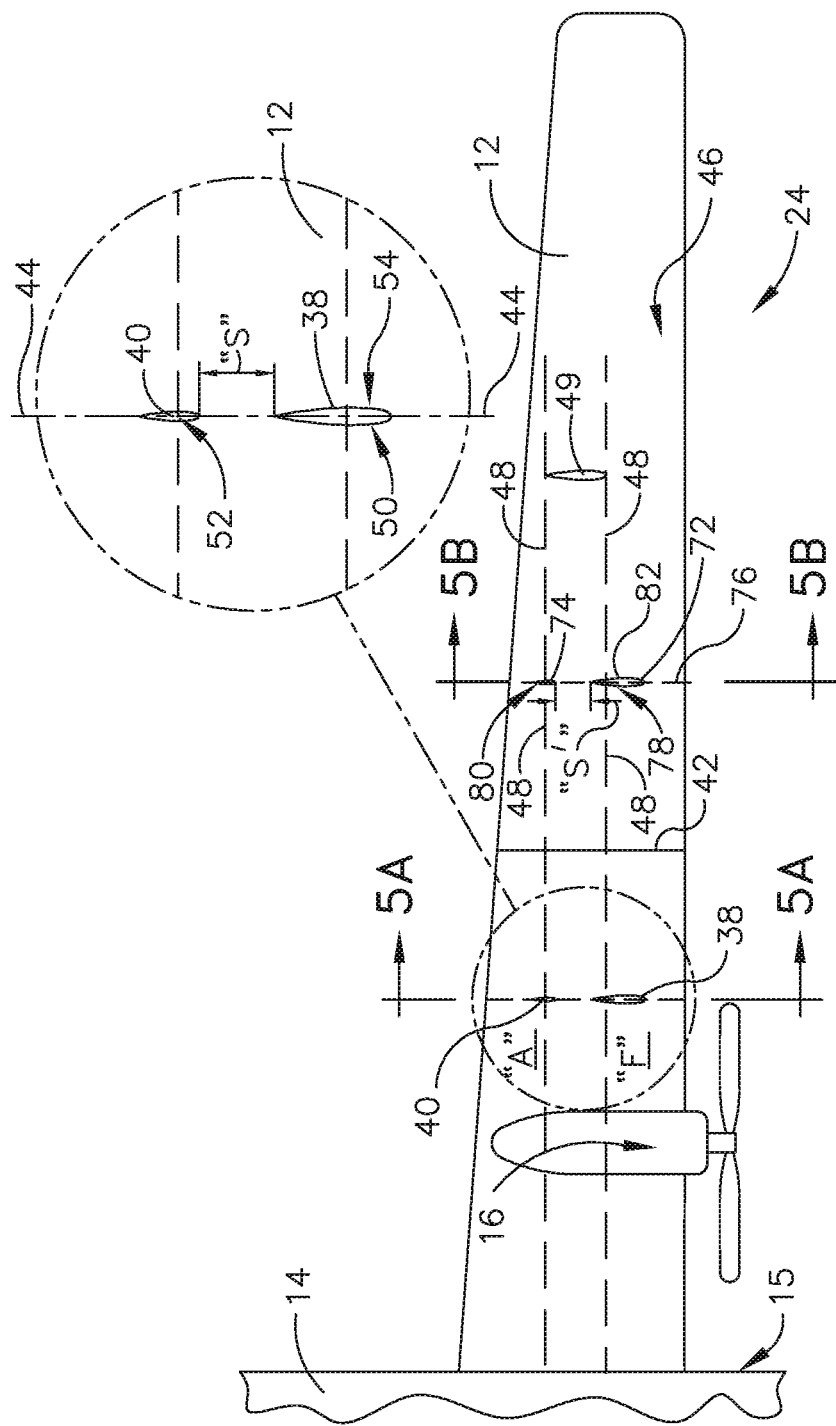
FIG. 4 is a top plan schematic view of the wing of the turboprop aircraft of first example of the first jury strut assembly and the first example of the second jury strut assembly of FIG. 3 connected to the wing.
Figure 5A:
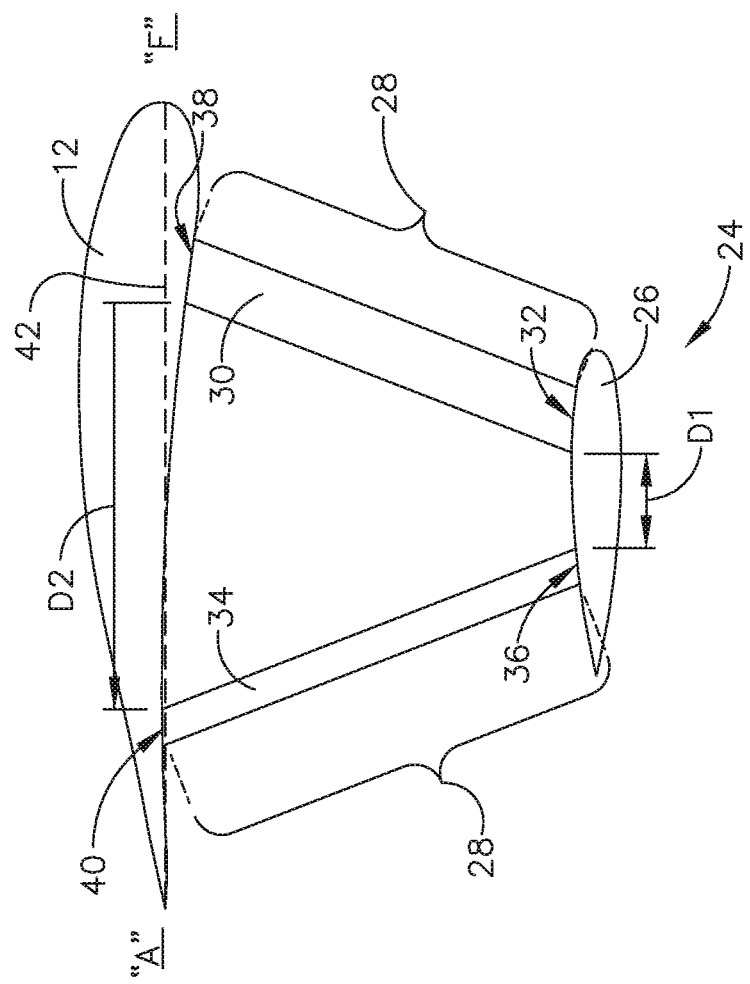
FIG. 5A is a cross section view along line 5A-5A of FIG. 4.

In referring to FIGS. 3-5A, strut system 24 for wing 12 of aircraft 14 is shown, wherein strut system 24 includes strut member 26 extending from wing 12. First example of first jury strut assembly 28 associated with wing 12 includes first jury strut 30, which has a first end 32 connected to strut member 26, and includes second jury strut 34, which has first end 36 connected to strut member 26, as seen in FIG. 5A. First example of first jury strut assembly 28 is positioned inboard on wing 12 relative to first example of second jury strut assembly 62 as seen in FIG. 3 with each having similar arrangement positioning of jury struts.

First example of first jury strut assembly 28 further includes second end 38 of first jury strut 30 and second end 40 of second jury strut 34, wherein each of second end 38 and second end 40 are connected to wing 12 spaced apart "S" from one another in direction of chord 42, as seen in FIG. 4. Second example of first jury strut assembly 28' of strut system 24 is shown in FIGS. 6-8A and will be discussed herein having a second positioning arrangement of jury struts different from the positioning arrangement of first example of first jury strut assembly 28.

In referring to strut system 24 having first example of first jury strut assembly 28, as seen in FIGS. 3-5A, second end 38 of first jury strut 30 and second end 40 of second jury strut 34 are each connected to wing 12 and positioned wherein second end 38 of first jury strut 30 and second end 40 of second jury strut 34 are positioned on first chord 44. Second end 38 of first jury strut 30 and second end 40 of second jury strut 34, in this example, are connected to skin 46 of wing 12 and spars 48 of wing 12. Similarly, second end 49 of strut member 26 is connected to skin 46 and spars 48. A wide variety of known connection arrangements can be used with respect to connecting jury struts and strut members to a wing utilizing various combinations of connections selected from skin, spars and rib structures of wing 12. In the present example, a first end (not shown) of strut member 26 is connected to a fuselage of aircraft 14 and as previously mentioned second end 49 is connected to wing 12.

In the present example, second end 38 of first jury strut 30, as well as, first jury strut 30 is positioned in forward position "F" relative to and separated from second end 40 of second jury strut 34 and with respect to second jury strut 34. Further in this example, second end 40 of second jury strut 34, as well as second jury strut 34, is positioned in aft position "A" relative to and separated from second end 38 of first jury strut 30, and with respect to first jury strut 30.

Second end 38 of first jury strut 30 and in this example a length of first jury strut 30 has a cross section area 50 greater than cross section area 52 of second jury strut 34, as seen in FIG. 4. A more robust construction of first jury strut 30 provides resistance to bird strikes that are more likely to be encountered by first jury strut 30 positioned in forward position "F" than by second jury strut 34 positioned aligned on first chord 44 and behind first jury strut 30 in aft position "A". The more robust construction of first jury strut 30 also provides blocking protection for trailing second jury strut 34 from bird strikes. In addition, with first jury strut 30 in forward position "F" relative to second jury strut 34 and being aligned along first chord 44, first jury strut 30 is provided, in this example, with an airfoil configuration 54, as seen in FIG. 4, so as to reduce drag on aircraft 14 during flight operations. In other examples, both first and second jury struts 30, 34 can be both provided with airfoil configurations as desired.

In further referring to first example of first jury strut assembly 28 of strut system 24, with second end 38 of first jury strut 30 and second end 40 of second jury strut 34 positioned on first chord 44, as seen in FIGS. 4 and 5A, first end 32 of first jury strut 30 and first end 36 of second jury strut 34 are spaced apart first distance D1 from one another in a direction of chord 42, as seen in FIG. 5A. Second end 38 of first jury strut 30 and second end 40 of second jury strut 34 are spaced apart "S", as seen in FIG. 4, a second distance D2 from one another in a direction of chord 42. Each of first distance D1 and second distance D2 is equal to or greater than a width dimension of a rotor (not shown) of an engine (not shown) of aircraft 14, thereby limiting any significant debilitating direct impact by a fragment in an engine rotor burst event to one of first or second jury struts 30, 34 and avoiding debilitating direct impact to both first and second jury struts 30, 34. With this positioning arrangement of first and second jury struts 30, 34, desired functionality of aircraft 14 can be maintained with at least one of the first or second jury struts 30, 34 being retained in an engine rotor burst event so long as appropriate safety structural design capacity has been incorporated into each of the first and second jury strut 30, 34 structural design. As a result, desired operation of aircraft 14 can be maintained with the loss of one of first or second jury struts 30, 34. In this example of jury struts shown in FIG. 5A, first and second jury struts 30, 34 are shown in nonparallel relationship to one another and in other examples, first and second jury struts 30, 34 can be positioned parallel to one another.

Figure 6:
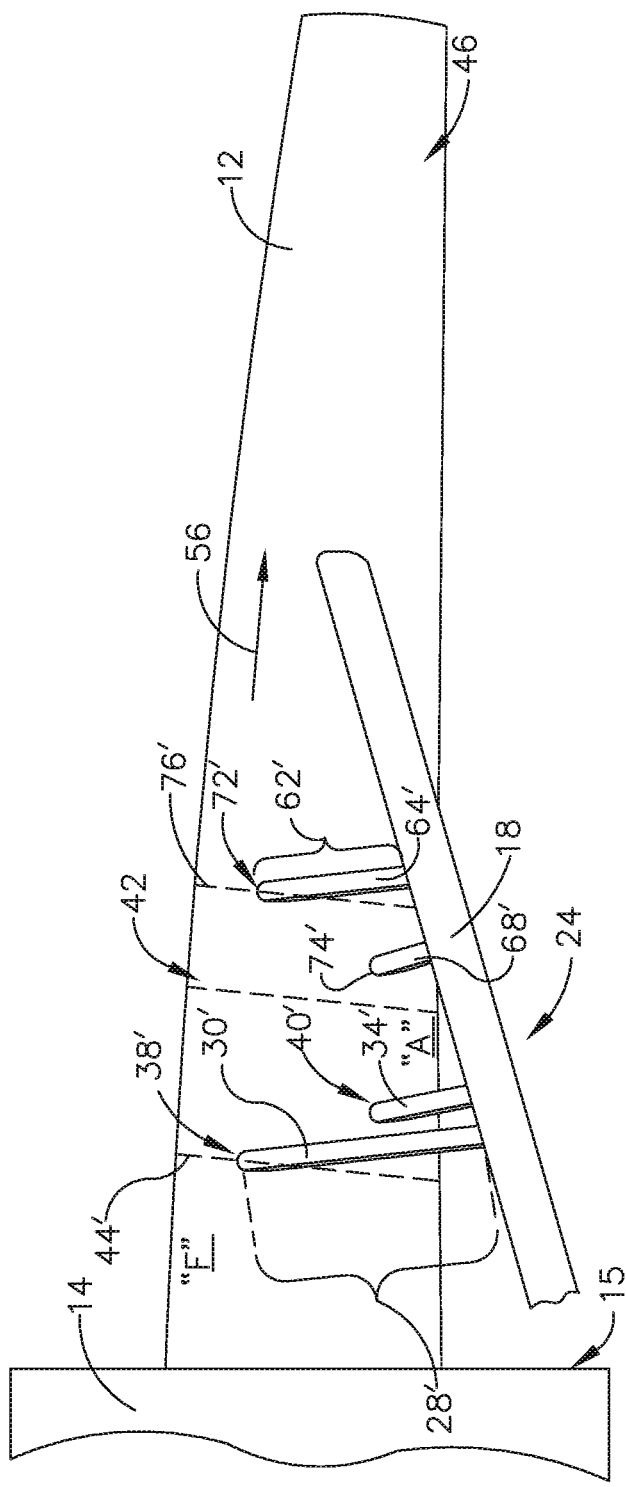
FIG. 6 is a perspective view from under the wing of the turboprop aircraft showing a second example of the first jury strut assembly (inboard on wing) and a second example of the second jury strut assembly (outboard on wing) of the present disclosure.
Figure 7:
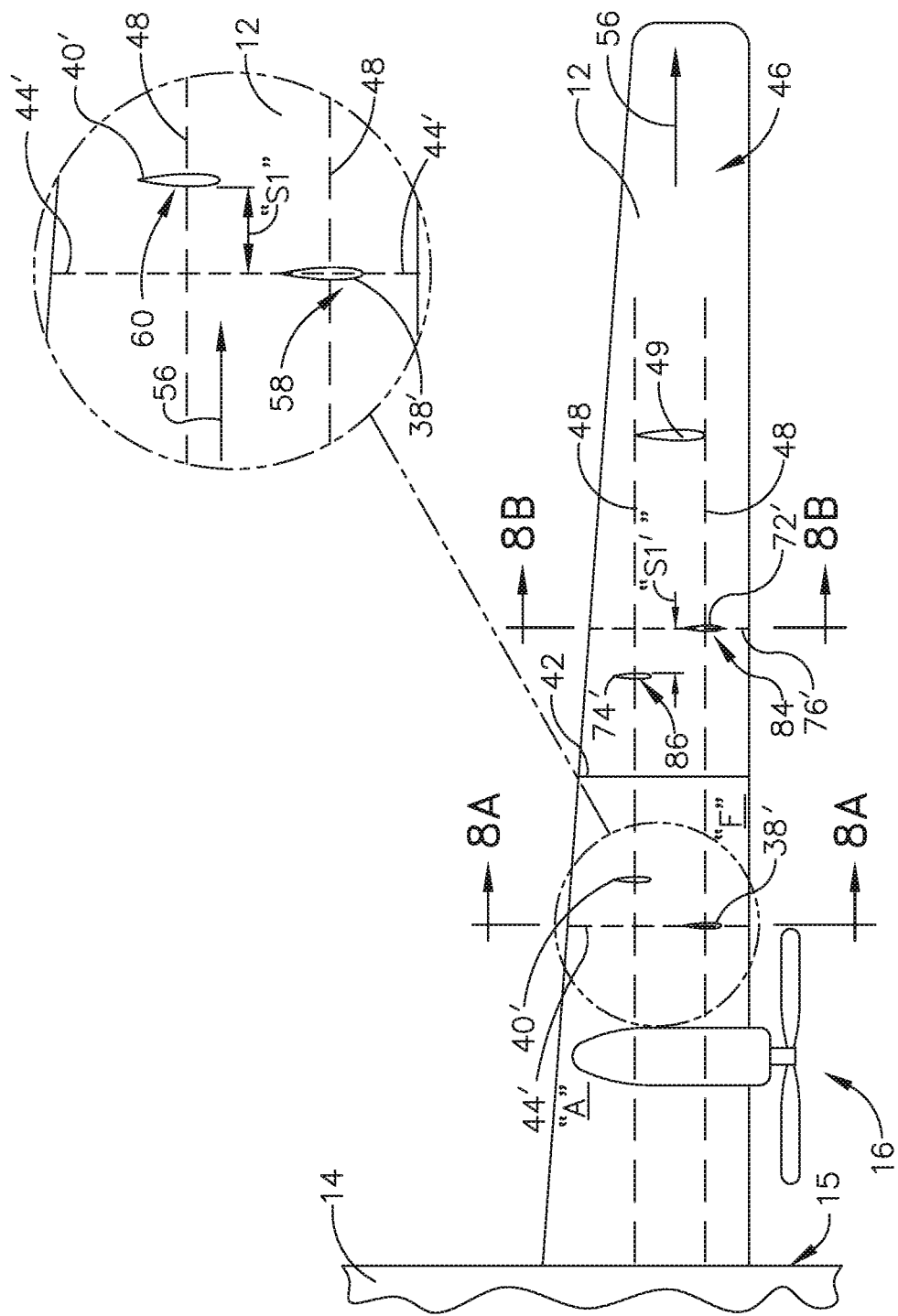
FIG. 7 is a top plan schematic view of the wing of the turboprop aircraft of the second example of the second example of the first jury strut assembly and the second example of the second jury strut assembly of FIG. 6 connected to the wing.

In referring to strut system 24, as seen in FIGS. 6-8A, second example of first jury strut assembly 28' is shown, which is inboard on wing 12 from second example of second jury strut assembly 62'. Second example of first jury strut assembly 28' includes one of second end 38' of first jury strut 30' or second end 40' of second jury strut 34' positioned on first chord 44'. In this example second end 38' of first jury strut 30' is positioned on first chord 44', as seen in FIGS. 6 and 7. Another of the one of the second end 38' of first jury strut 30' or second end 40' of second jury strut 34' is spaced apart from first chord 44' in a span wise direction 56 along wing 12. As seen in FIG. 7 in this example, second end 40' of first jury strut 30' is spaced apart "S1" from first chord 44' in span wise direction 56 along wing 12 wherein spaced apart "S1" is sufficient spacing to include spacing apart of second end 38' and first jury strut 30' from second end 40' and second jury strut 34' in span wise direction 56, so as to provide reduced vulnerability of both first and second jury struts 30', 34' of second example of first jury strut assembly 28' from experiencing severe direct impact damage from a single bird encounter. As a result, design spacing selection of "S1", includes sufficient spacing between first and second jury struts 30', 34' as mentioned earlier by the analysts, which will reduce vulnerability of first and second jury struts 30', 34' from both being disabled with a direct bird impact. Desired operation of aircraft 14 will be maintained so long as adequate design capacity is provided to each of first and second jury struts 30' and 34', wherein loss of one of the jury struts will still provide sufficient operational support with the remaining jury strut in second example of first jury strut assembly 28'.

Second end 38' of first jury strut 30', as well as in this example, first jury strut 30' are positioned in forward position "F" relative to and separated from second end 40' of second jury strut 34' and second jury strut 34'. Second end 40' of second jury strut 34' as well as in this example second jury strut 34' is positioned in an aft position "A" relative to and separated from second end 38' of first jury strut 30' and second jury strut 34'. Wherein with one of second end 38' of first jury strut 30' or second end 40' of second jury strut 34' positioned on first chord 44' and another of the one of second end 38' of the first jury strut 30' or second end 40' of second jury strut 34' is spaced apart "S1" from first chord 44' in the span wise direction 56 along wing 12, each of first jury strut 30' and second jury strut 34' each have an airfoil configuration 58, 60, respectively providing less drag to aircraft 14 in operation.

Figure 8A:
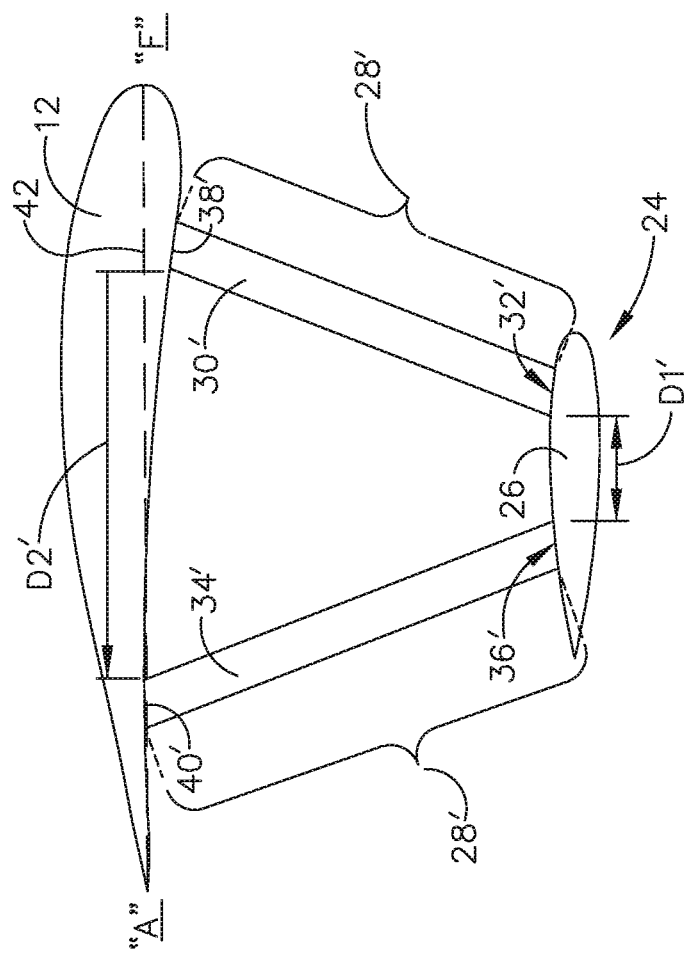
FIG. 8A is a cross section view along line 8A-8A of FIG. 7.

In further referring to strut system 24 with respect to second example of first jury strut assembly 28', with one of second end 38' of first jury strut 30' or second end 40' of second jury strut 34' positioned on first chord 44', wherein in this example second end 38' of first jury strut 30' is positioned on first chord 44'. Another of the one of second end 38' of first jury strut 30' or second end 40' of second jury strut 34' is spaced apart "S1" from first chord 44' in span wise direction 56 along wing 12 as described earlier. In this example, second end 40' of second jury strut 34' is spaced apart from first chord 44'. First end 32' of first jury strut 30' and the first end 36' of second jury strut 34' are spaced apart a first distance D1' from one another in a direction of chord 42, as seen in FIG. 8A, and second end 38' of first jury strut 30' and second end 40' of second jury strut 34' are spaced apart second distance D2' from one another in direction of chord 42. Each of first distance D1' and second distance D2' is equal to or greater than a width dimension of a rotor (not shown) of an engine (not shown) of aircraft 14, thereby limiting significant debilitating direct impact damage by a fragment in an engine rotor burst event to one of first or second jury struts 30', 34' and avoiding direct impact damage to both first and second jury struts 30', 34' by such fragment. With this positioning arrangement of first and second jury struts 30', 34', desired functionality of aircraft 14 can be maintained with at least one of the first or second jury struts 30, 34 being retained in an engine rotor burst event so long as appropriate safety structural design capacity has been incorporated into each of the first and second jury strut 30', 34' structural design. As a result, desired operation of aircraft 14 can be maintained with the loss of one of first or second jury struts 30', 34'. In this example of jury struts shown in FIG. 8A, first and second jury struts 30', 34' are shown nonparallel to one another and in other examples first and second jury struts 30', 34' can be positioned parallel to one another.

Figure 5B:
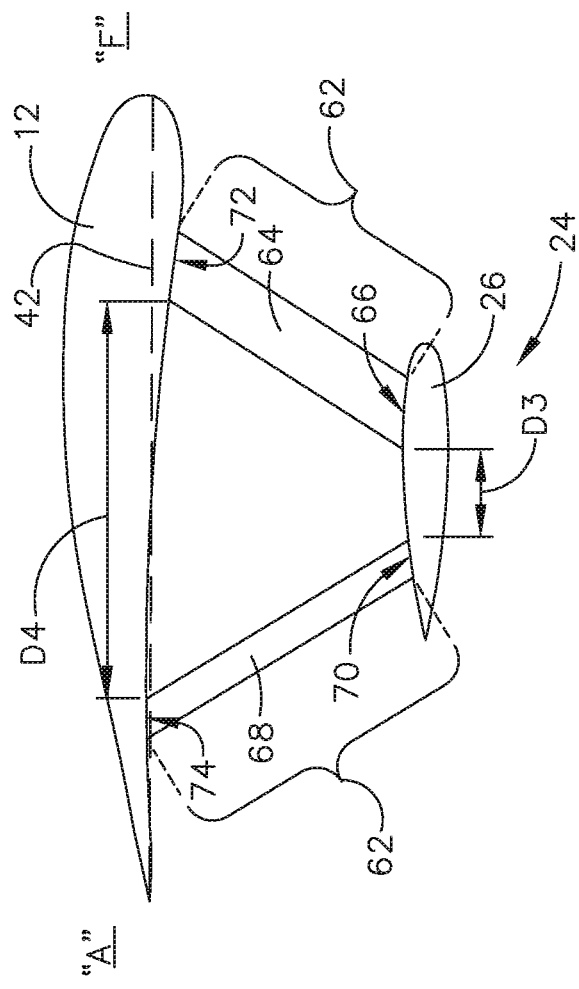
FIG. 5B is a cross section view along line 5B-5B of FIG. 4.
Figure 8B:
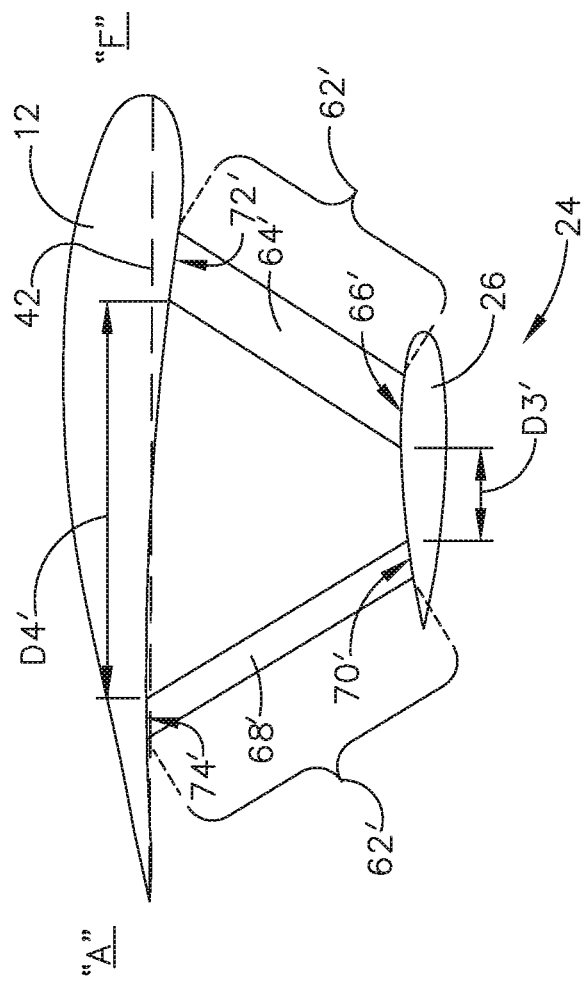
FIG. 8B is a cross section view along line 8B-8B of FIG. 7.

Strut system 24 further includes first example of second jury strut assembly 62 associated with wing 12, shown in FIGS. 3, 4 and 5B, which is positioned outboard on wing 12 relative to first example of first jury strut assembly 28. Second example of second jury strut assembly 62', as shown in FIGS. 6, 7 and 8B, which is positioned outboard on wing 12 relative to second example of first jury strut assembly 28', will be discussed herein.

First example of second jury strut assembly 62, as shown in FIGS. 3 and 5B, includes third jury strut 64 having first end 66 and fourth jury strut 68 having first end 70 connected to strut member 26, having a similar positioning arrangement as first example of first jury strut assembly 28 of FIG. 5A. Second end 72 of third jury strut 64 and second end 74 of fourth jury strut 68 are each connected to wing 12 spaced apart "S'" from one another in a direction of chord 42, as seen in FIG. 4. As discussed earlier, a wide variety of known connection arrangements can be used with respect to connecting jury struts to a wing. As seen in FIG. 3, first chord 44 of the first jury strut assembly 28 and second chord 76 of first example of second jury strut assembly 62 are spaced apart from one another in span wise direction 56 of wing 12. First example of second jury strut assembly 62 includes second end 72 of third jury strut 64 and second end 74 of fourth jury strut 68 connected to wing 12, as seen in FIG. 5B, with in this example, second end 72, of third jury strut 64 and second end 74 of fourth jury strut 68 being positioned on second chord 76, as seen in FIG. 3. This positioning of second ends 72, 74 is a similar positioning arrangement as first example of first jury strut assembly 28 wherein second ends 38 and 40, as seen in FIG. 4, are positioned on first chord 44.

The first example of second jury strut assembly 62 has second end 72 of third jury strut 64 as well as third jury strut 64 positioned in forward positon "F" relative to second end 74 of fourth jury strut 68 as well as fourth jury strut 68. Further in this example, second end 74 of fourth jury strut 68 as well as fourth jury strut 68 is positioned in aft position "A" relative to second end 72 of third jury strut 64 as well as third jury strut 64. With second end 72 of third jury strut 64 and second end 74 of fourth jury strut 68 positioned on second chord 76, third jury strut 64 has in this example cross section area 78 greater than cross section area 80 of fourth jury strut 68 as seen in FIG. 4. A more robust construction of third jury strut 64 provides resistance to bird strikes that are more likely to be encountered by third jury strut 64 positioned in forward position "F" than fourth jury strut 68 positioned aligned on second chord 76 and behind third jury strut 64 in aft position "A". The more robust construction of third jury strut 64 also provides blocking protection for trailing fourth jury strut 68 from bird strikes.

With second end 72 of third jury strut 64 and the second end 74 of fourth jury strut 68 positioned on second chord 76 and third jury strut 64 and fourth jury strut 68 aligned along second chord 76, as seen in FIG. 3, third jury strut 64, as seen in FIG. 4, has airfoil configuration 82. With third jury strut 64 in forward position "F", as seen in FIG. 5B, relative to fourth jury strut 68, third jury strut 64 is provided, in this example, with an airfoil configuration 82 as seen in FIG. 4, so as to reduce drag on aircraft 14 during flight operations. In other examples, both third and fourth jury struts 64, 68 can be both provided with airfoil configurations as desired.

As seen in FIG. 5B, with second end 72 of third jury strut 64 and second end 74 of fourth jury strut 68 positioned on second chord 76, first end 66 of third jury strut 64 and first end 70 of fourth jury strut 68 are spaced apart first distance D3 from one another in direction of the chord 42. Second end 72 of third jury strut 64 and second end 74 of fourth jury strut 68 are spaced apart second distance D4 from one another in the direction of chord 42. Each of first distance D3 and second distance D4 is equal to or greater than a width dimension of a rotor (not shown) of an engine (not shown) of aircraft, 14, thereby limiting any significant debilitating direct impact by a fragment in an engine rotor burst event to one of third and fourth jury struts 64, 68 and avoiding debilitating direct impact to both third and fourth jury struts 64, 68. With this positioning arrangement of third and fourth jury struts 64, 68, desired functionality of aircraft 14 can be maintained with at least one of the third or fourth jury struts 64, 68 being retained in an engine rotor burst event so long as appropriate safety structural design capacity has been incorporated into each of the third and fourth jury strut 64, 68 structural design. As a result, desired operation of aircraft 14 can be maintained with the loss of one of third or fourth jury struts 64, 68. In the example of jury struts shown in FIG. 5B, third and fourth jury struts 64, 68 are shown nonparallel to one another and in other examples third and fourth jury struts 64, 68 can be positioned parallel to one another.

Second example of second jury strut assembly 62' as shown in FIGS. 6 and 8B includes third jury strut 64' having first end 66' and fourth jury strut 68' having first end 70' connected to strut member 26, having a similar construction as second example of first jury strut assembly 28' of FIGS. 6, 7 and 8A. Second end 72' of third jury strut 64' and second end 74' of fourth jury strut 68' are each connected to wing 12 spaced apart from one another in a direction of chord 42, as seen in FIG. 8B. In this example, as a seen in FIG. 6, first chord 44' of second example of first jury strut assembly 28' and second chord 76' of second example of second jury strut assembly 62' are spaced apart from one another in a span wise direction of wing 12. In this example, as seen in FIGS. 7 and 8B, one of second end 72' of third jury strut 64' or second end 74' of fourth jury strut 68' is positioned on second chord 76'. In this example, second end 72' of third jury strut 64' is positioned on second chord 76'. Another one of second end 72' of third jury strut 64' or second 74' of fourth jury strut 68' is spaced apart from second chord 76' in span wise direction 56 along wing 12. As seen in FIG. 7, second end 74' of fourth jury strut 68' is spaced apart "S1'" to include spacing apart of second end 72' of third jury strut 64' and third jury strut 64' from second end 74' of fourth jury strut 68' and fourth jury strut 68', in a span wise direction 56 along wing 12. The spacing apart of third jury strut 64' and fourth jury strut 68' in span wise direction 56, provides reduced vulnerability of both third and fourth jury struts 64', 68' of second example of second jury strut assembly 62' from experiencing severe direct impact damage from a single bird encounter. As a result, design spacing selection of "S1'", includes, as suggested by the analysts, sufficient spacing between first and second jury struts 30', 34' which will reduce vulnerability of third and fourth jury struts 64', 68' from both being disabled with a direct bird impact and with adequate design capacity of each of third and fourth jury struts 64' and 68', loss of one of the jury struts will still result in a remaining jury strut of third and fourth jury struts 64', 68' providing sufficient desired operational support for aircraft 14 with one remaining jury strut in second example of second jury strut assembly 62'.

In this example, second end 72' of third jury strut 64' as well as third jury strut 64' are positioned in forward position "F" relative to second end 74' of fourth jury strut 68' and fourth jury strut 64'. Also in this example, second end 74' of fourth jury strut 68' as well as fourth jury strut 68' are positioned in aft position "A" relative to second end 72' of third jury strut 64' and third jury strut 64'. With third and fourth jury struts 64', 68' spaced apart along span wise direction 56 of wing 12 both third and fourth jury struts 64', 68' each have an airfoil configuration 84, 86 respectively, as seen in FIG. 7. Airfoil configurations 84, 86 reduce drag with aircraft 14 in flight operations.

In second example of second jury strut assembly 62', with one of second end 72' of third jury strut 64' or second end 74' of fourth jury strut 68' is positioned on second chord 76'. In this example, as seen in FIG. 6, second end 72' of third jury strut 68' is positioned on second chord 76'. Another of one of second end 72' of third jury strut 64' or second end 74' of fourth jury strut 68' is spaced apart "S1'" from second chord 76' in span wise direction 56 along wing 12. In the present example, second end 74' of fourth jury strut 68', as seen in FIGS. 6 and 7 is spaced apart from second chord 76' in span wise direction 56 along wing 12. In referring to FIG. 8B, first end 66' of third jury strut 64' and first end 70' of fourth jury strut 68' are spaced apart first distance D3' from one another in direction of chord 42 and second end 72' of third jury strut 64' and second end 74' of fourth jury strut 68' are spaced apart second distance D4' from one another in direction of chord 42. Each of first distance D3' and second distance D4' is equal to or greater than a width dimension of a rotor (not shown) of an engine (not shown) of aircraft 14, thereby limiting any significant debilitating direct impact by a fragment in an engine rotor burst event to one of third or fourth jury struts 64', 68' and avoiding debilitating direct impact to both third and fourth jury struts 64', 68'. With this positioning arrangement of third and fourth jury struts 64', 68', desired functionality of aircraft 14 can be maintained with at least one of the third or fourth jury struts 64', 68' being retained in an engine rotor burst event so long as appropriate safety structural design capacity has been incorporated into each of the third and fourth jury strut 64', 68' structural design. As a result, desired operation of aircraft 14 can be sustained with the loss of one of third or fourth jury struts 64', 68'. In this example of jury struts shown in FIG. 8B, third and fourth jury struts 64', 68' are shown nonparallel to one another and in other examples third and fourth jury struts 64', 68' can be positioned parallel to one another.

Figure 9:
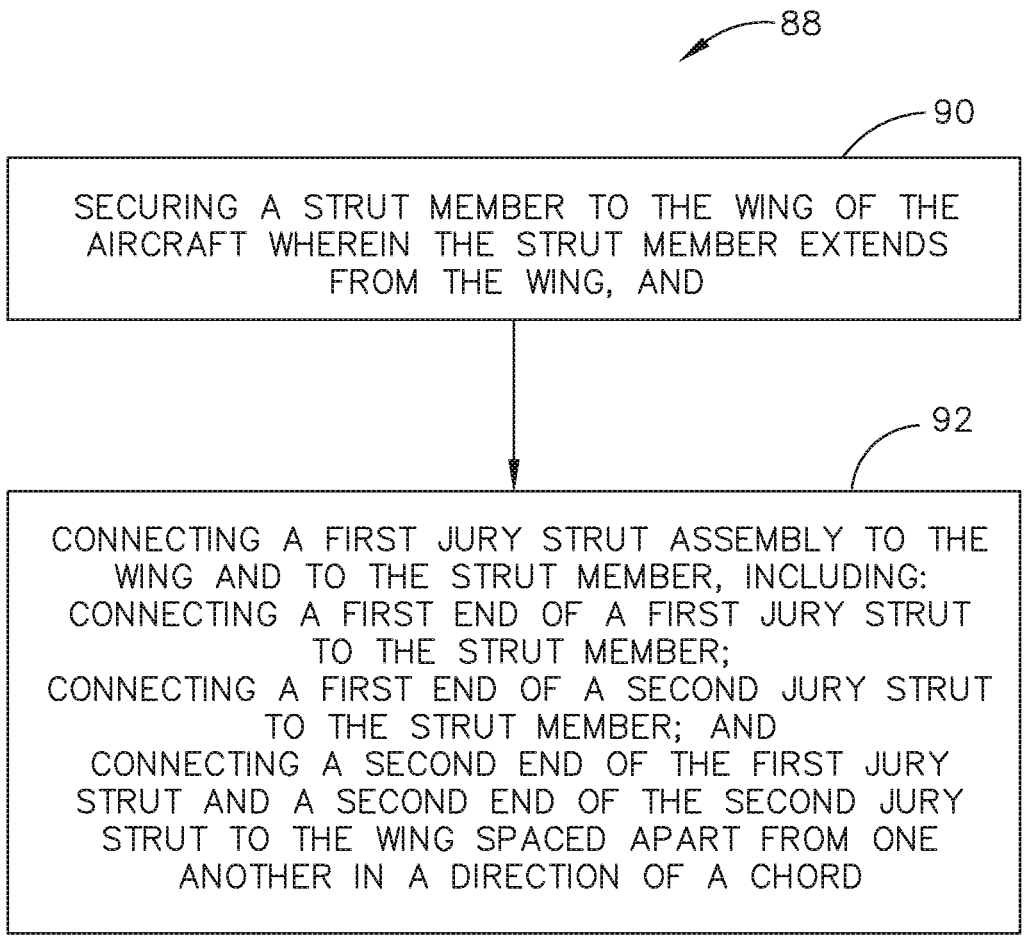
FIG. 9 is a flow chart of a method for installing a strut system for a wing of an aircraft.

In referring to FIG. 9, method 88 for installing strut system 24 for wing 12 of aircraft 14 is shown. Method 88 includes configurations of first example and second example of first jury strut assembly 28, 28', which are positioned inboard on wing 12 relative to first and second example of second jury strut assembly 62, 62', respectively, wherein first example of first and second jury strut assemblies 28, 62 has jury strut position arrangements which are similar to one another and which differ from second example of first and second jury strut assemblies 28', 62' which has jury strut position arrangements similar to one another.

Method 88 includes step of securing 90 strut member 26 to wing 12 of aircraft 14 and securing strut member 26 to fuselage 15 of aircraft 14. Method 88 applies to both first and second examples of first jury strut assemblies 28, 28' and to both first and second examples of second jury strut assemblies 62, 62'.

Method 88 includes step of connecting 92 first jury strut assembly 28, 28' to wing 12 and to strut member 26, as seen in FIGS. 3 and 8, respectively, including connecting, as seen in FIGS. 5A and 8A, respectively, first end 32, 32' of first jury strut 30, 30' to strut member 26, connecting first end 36, 36' of second jury strut 34, 34' to strut member 26 and connecting second end 38, 38' of first jury strut 30, 30' and second end 40, 40' of second jury strut 34, 34' to wing 12 spaced apart from one another in direction of chord 42.

Method 88 further includes connecting, as seen in FIGS. 5A and 8A, respectively, second end 38, 38' of the first jury strut 30, 30' and second end 40, 40' of second jury strut 34, 34' to wing 12 and spaced apart from one another at wing 12 positioned, in one of two positions relative to one another. One arrangement positioning includes second end 38 of first jury strut 30 and second end 40 of second jury strut 34 being positioned on first chord 44, as seen in FIGS. 3 and 4. A second arrangement positioning includes one of second end 38' of first jury strut 30' or second end 40' of second jury strut 34' is positioned on first chord 44' and another of one of second end 38' of the first jury strut 30 ' or the second end 40' of the second jury strut 34' is spaced apart from first chord 44' in span wise direction 56 along wing 12, as seen in FIGS. 6 and 7. In earlier example discussed above second end 38' of first jury strut 30' was positioned on first chord 44', as seen in FIG. 7.

As described earlier, second end 38, 38' of first jury strut 30, 30' and first jury strut 30, 30' are positioned in a forward position "F" relative to second end 40, 40' of second jury strut 34, 34' and second end 40, 40' of second jury strut 34, 34' and second jury strut 34, 34' are positioned in aft position "A" relative to second end 38, 38' of first jury strut 30, 30'.

With second end 38 of first jury strut 30 and second end 40 of second jury strut 34 positioned on first chord 44, first jury strut 30 has cross section area 50 greater than cross section area 52 of second jury strut 34, as seen in FIGS. 4 and 5. First jury strut 30 has airfoil configuration 54, as seen in FIG. 4; first end 32 of first jury strut 30 and first end 36 of second jury strut 34 are spaced apart first distance D1 from one another in direction of chord 42 and second end 38 of first jury strut 30 and second end 40 of second jury strut 34 are spaced apart second distance D2 from one another in direction of chord 42, as seen in FIG. 5A. Each of first distance D1 and second distance D2 is equal to or greater than a width dimension of a rotor (not shown) of an engine (not shown) of aircraft (14). Alternatively, with one of second end 38' of first jury strut 30' or second end 40' of second jury strut 34' is positioned on first chord 44' and other of the one of second end 38' of first jury strut 30' or second end 40' of second jury strut 34' is spaced apart from first chord 44' in span wise direction 56 along wing 12. In the example described above, first jury strut 30' was positioned on first chord 44', as seen in FIG. 6. In referring to FIG. 8A, first jury strut 30' and second jury strut 34' have an airfoil configuration 84, 86 respectively. First end 32' of first jury strut 30' and first end 36' of second jury strut 34' are spaced apart from one another first distance D1' in a direction of chord 42 and second end 38' of first jury strut 30' and second end 40' of second jury strut 34' are spaced apart second distance D2' from one another in direction of chord 42. Each of first distance D1' and second distance D2' is equal to or greater than a width dimension of a rotor (not shown) of an engine (not shown) of aircraft 14.

Method 88 further includes connecting second jury strut assembly 62, 62' to strut member 26 and to wing 12, wherein first jury strut assembly 28, 28' and second jury strut assembly 62, 62' are spaced apart from one another in span wise direction 56 along wing 12. Method 88 further includes connecting, as seen in FIGS. 5B and 8B, first end 66, 66' of third jury strut 64, 64' to strut member 26 and connecting first end 70, 70' of fourth jury strut 68, 68' to strut member 26 spaced apart from one another in direction of chord 42 and further includes connecting second end 72, 72' of third jury strut 64, 64' and second end 74, 74' of fourth jury strut 68, 68' to wing 12 and spaced apart from one another in direction of chord 42.

Method 88 further includes connecting second end 72, 72' of third jury strut 64, 64' and second end 74, 74' of fourth jury strut 68, 68' to wing 12 spaced apart from one another at wing 12 positioned in one of two arrangement positions relative to one another. A first arrangement position includes second end 72 of third jury strut 64 and second end 74 of fourth jury strut 68 are positioned on second chord 76, as seen in FIGS. 3 and 4. Alternatively a second arrangement position includes one of second end 72' of third jury strut 64' or second end 74' of fourth jury strut 68' is positioned on second chord 76' and another of one of second end 72' of third jury strut 64' or second end 74' of fourth jury strut 68' is spaced apart from second chord 76' in span wise direction 56 along wing 12, as seen in FIGS. 6 and 7. In earlier described example, second end 72' of third jury strut 64' was positioned on second chord 76'.

In first and second examples of second jury strut assembly 62, 62', as seen in FIGS. 5B and 8B, second end 72, 72' of third jury strut 64, 64' and third jury strut 64, 64' is positioned in forward position "F" relative and spaced apart from second end 74, 74' of fourth jury strut 68, 68' and fourth jury strut 68, 68'. Second end 74, 74' of fourth jury strut 68, 68' and fourth jury strut 68, 68' is positioned in aft position "A" relative and spaced apart from second end 74, 74' of third jury strut 64, 64' and third jury strut 64, 64'.

With second end 72 of third jury strut 64 and second end 74 of fourth jury strut 68 positioned on second chord 76, as seen in FIG. 4, third jury strut 64 has a cross section area 78 greater than cross section area 80 of fourth jury strut 68 and third jury strut 64 has airfoil configuration 82. First end 66 of third jury strut 64 and first end 70 of fourth jury strut 68 are spaced apart first distance D3 from one another in direction of chord 42 and second end 72 of third jury strut 64 and second end 74 of fourth jury strut 68 are spaced apart second distance D4 from one another in direction of chord 42, as seen in FIG. 5B. Each of first distance D3 and second distance D4 is equal to or greater than a width dimension of a rotor (not shown) of an engine (not shown) of aircraft 14.

With one of second end 72' of third jury strut 64' or second end 74' of fourth jury strut 68' positioned on second chord 76', as seen in FIG. 7, and another of one of second end 72' of third jury strut 64' or second end 74' of fourth jury strut 68' is spaced apart from second chord 76' in span wise direction 56 along wing 12. In the example earlier described, second end 72' was positioned on second chord 76'. As seen in FIG. 8B, first end 66' of third jury strut 64' and first end 70' of fourth jury strut 68' are spaced apart first distance D3' from one another in direction of chord 42 and second end 72' of third jury strut 64' and second end 74' of fourth jury strut 68' are spaced apart second distance D4' from one another in direction of chord 42. Each of first distance D3' and second distance D4' is equal to or greater than a width dimension of a rotor (not shown) of an engine (not shown) of aircraft 14.

While various embodiments have been described above, this disclosure is not intended to be limited thereto. Variations can be made to the disclosed embodiments that are still within the scope of the appended claims.

What is claimed:

1. A strut system for a wing of an aircraft, comprising:
   a strut member extending from the wing; and
   a first jury strut assembly associated with the wing, comprising:
      a first jury strut, which has a first end connected to the strut member; and
      a second jury strut, which has a first end connected to the strut member, wherein a second end of the first jury strut and a second end of the second jury strut are each connected to the wing spaced apart from one another in a direction of a chord.

2. The strut system of claim 1, wherein with the first jury strut assembly includes the second end of the first jury strut and the second end of the second jury strut connected to the wing, the second end of the first jury strut and the second end of the second jury strut are positioned in one of two positions relative to one another of:
   the second end of the first jury strut and the second end of the second jury strut are positioned on a first chord; or
   one of the second end of the first jury strut or the second end of the second jury strut is positioned on the first chord and another of the one of the second end of the first jury strut or the second end of the second jury strut is spaced apart from the first chord in a span wise direction along the wing.

3. The strut system of claim 2, wherein:
   the second end of the first jury strut is positioned in a forward position relative to the second end of the second jury strut; and
   the second end of the second jury strut is positioned in an aft position relative to the second end of the first jury strut.

4. The strut system of claim 3, wherein with the second end of the first jury strut and the second end of the second jury strut positioned on the first chord, the first jury strut has a cross section area greater than a cross section area of second jury strut.

5. The strut system of claim 2, wherein with the second end of the first jury strut and the second end of the second jury strut positioned on the first chord, the first end of the first jury strut and the first end of the second jury strut are spaced apart a first distance from one another in the direction of the chord and the second end of the first jury strut and the second end of the second jury strut are spaced apart a second distance from one another in the direction of the chord, each of the first distance and the second distance is equal to or greater than a width dimension of a rotor of an engine of the aircraft.

6. The strut system of claim 2, wherein with one of the second end of the first jury strut or the second end of the second jury strut positioned on the first chord and another of the one of the second end of the first jury strut or the second end of the second jury strut is spaced apart from the first chord in the span wise direction along the wing, the first end of the first jury strut and the first end of the second jury strut are spaced apart a first distance from one another in the direction along the chord and the second end of the first jury strut and the second end of the second jury strut are spaced apart a second distance from one another in the direction along the chord, each of the first distance and the second distance is equal to or greater than a width dimension of a rotor of an engine of the aircraft.

7. The strut system of claim 1, further includes a second jury strut assembly associated with the wing.

8. The strut system of claim 7, wherein the second jury strut assembly comprises:
a third jury strut having a first end connected to the strut member; and
a fourth jury strut having a first end connected to the strut member, wherein a second end of the third jury strut and a second end of the fourth jury strut are each connected to the wing spaced apart from one another in the direction of the chord.

9. The strut system of claim 8, wherein a first chord of the first jury strut assembly and a second chord of the second jury strut assembly are spaced apart from one another in a span wise direction of the wing.

10. The strut system of claim 9, wherein the second jury strut assembly includes the second end of the third jury strut and the second end of the fourth jury strut connected to the wing with the second end of the third jury strut and the second end of the fourth jury strut are each positioned on the second chord.

11. The strut system, of claim 9, wherein the second jury strut assembly includes the second end of the third jury strut and the second end of the fourth jury strut connected to the wing with one of the second end of the third jury strut or the second end of the fourth jury strut positioned on the second chord and another one of the second end of the third jury strut or the second end of the fourth jury strut spaced apart from the second chord in a span wise direction along the wing.

12. The strut system of claim 11, wherein:
the second end of the third jury strut is positioned in a forward positon relative to the second end of the fourth jury strut; and
the second end of the fourth jury strut is positioned in an aft positon relative to the second end of the third jury strut.

13. The strut system of claim 12, wherein with the second end of the third jury strut and the second end of the fourth jury strut positioned on the second chord, the third jury strut has a cross section area greater than a cross section area of fourth jury strut.

14. The strut system of claim 12, wherein with the second end of the third jury strut and the second end of the fourth jury strut positioned on the second chord, the third jury strut has an airfoil configuration.

15. The strut system of claim 11, wherein with the one of the second end of the third jury strut or the second end of the fourth jury strut positioned on the second chord and another of the one of the second end of the third jury strut or the second end of the fourth jury strut is spaced apart from the second chord in the span wise direction along the wing, the third jury strut and the fourth jury strut each have an airfoil configuration.

16. The strut system of claim 11, wherein:
with the second end of the third jury strut and the second end of the fourth jury strut positioned on the second chord, the first end of the third jury strut and the first end of the fourth jury strut are spaced apart a first distance from one another in the direction of the chord and the second end of the third jury strut and the second end of the fourth jury strut are spaced apart a second distance from one another in the direction of the chord, each of the first distance and the second distance is equal to or greater than a width dimension of a rotor of an engine of the aircraft, or with one of the second end of the third jury strut or the second end of the fourth jury strut positioned on the second chord and another of the one of the second end of the third jury strut or the second end of the fourth jury strut is spaced apart from the second chord in the span wise direction along the wing, the first end of the third jury strut and the first end of the fourth jury strut are spaced apart a first distance from one another in the direction of the chord and the second end of the third jury strut and the second end of the fourth jury strut are spaced apart a second distance from one another in the direction of the chord, each of the first distance and the second distance is equal to or greater than a width dimension of a rotor of an engine of the aircraft.

17. A method for installing a strut system for a wing of an aircraft, comprising:
securing a strut member to the wing of the aircraft and securing the strut member to a fuselage of the aircraft, and
connecting a first jury strut assembly to the wing and to the strut member, including:
connecting a first end of a first jury strut to the strut member;
connecting a first end of a second jury strut to the strut member; and
connecting a second end of the first jury strut and a second end of the second jury strut to the wing spaced apart from one another in a direction of a chord.

18. The method of claim 17, further including:
connecting the second end of the first jury strut and the second end of the second jury strut to the wing and spaced apart from one another at the wing positioned in one of two positions relative to one another of:
the second end of the first jury strut and the second end of the second jury strut are positioned on a first chord; or
one of the second end of the first jury strut or the second end of the second jury strut is positioned on the first chord and another of the one of the second end of the first jury strut or the second end of the second jury strut is spaced apart from the first chord in a span wise direction along the wing, wherein:
the second end of the first jury strut is positioned in a forward position relative to the second end of the second jury strut;
the second end of the second jury strut is positioned in an aft position relative to the second end of the first jury strut; and
with the second end of the first jury strut and the second end of the second jury strut positioned on a first chord, the first jury strut has a cross section area greater than a cross section area of the second jury strut, the first jury strut has an airfoil configuration, the first end of the first jury strut and the first end of the second jury strut are spaced apart a first distance from one another in the direction of the chord and the second end of the first jury strut and the second end of the second jury strut are spaced apart a second distance from one another in the direction of the chord, each of the first distance and the second distance is equal to or greater than a width dimension of a rotor of an engine of the aircraft; or with the one of the second end of the first jury strut or the second end of the second jury strut is positioned on the first chord and other of the one of the second end of the first jury strut or the second end of the second jury strut is spaced apart from the first chord in the span wise direction along the wing, the first jury strut and the second jury strut have an airfoil configuration, the first end of the first jury strut and the first end of the second jury strut are spaced apart from one another a first distance in the direction of the chord and the second end of the first jury strut and the second end of the second jury strut are spaced apart a second distance from one another in the direction of the chord, each of the first distance and the second distance is equal to or greater than a width dimension of a rotor of an engine of the aircraft.

19. The method of claim 17, further including:

connecting a second jury strut assembly to the strut member and to the wing wherein the first jury strut assembly and the second jury strut assembly are spaced apart from one another in a span wise direction along the wing;

connecting a first end of a third jury strut to the strut member;

connecting a first end of a fourth jury strut to the strut member; and connecting a second end of the third jury strut and a second end of the fourth jury strut to the wing and spaced apart from one another in the direction of the chord.

20. The method of claim 19, further including:

connecting the second end of the third jury strut and the second end of the fourth jury strut to the wing spaced apart from one another at the wing positioned in one of two positions relative to one another of:

the second end of the third jury strut and the second end of the fourth jury strut are positioned on a second chord; or one of the second end of the third jury strut or the second end of the fourth jury strut is positioned on the second chord and another of the one of the second end of the third jury strut or the second end of the fourth jury strut is spaced apart from the second chord in the span wise direction along the wing, wherein:

the second end of the third jury strut is positioned in a forward position relative to the second end of the fourth jury strut;

the second end of the fourth jury strut is positioned in an aft position relative to the second end of the third jury strut; and with the second end of the third jury strut and the second end of the fourth jury strut positioned on a second chord, the third jury strut has a cross section area greater than a cross section area of the fourth jury strut, the third jury strut has an airfoil configuration, the first end of the third jury strut and the first end of the fourth jury strut are spaced apart a first distance from one another in the direction of the chord and the second end of the third jury strut and the second end of the fourth jury strut are spaced apart a second distance from one another in the direction of the chord, each of the first distance and the second distance is equal to or greater than a width dimension of a rotor of an engine of the aircraft, or with one of the second end of the third jury strut or the second end of the fourth jury strut positioned on the second chord and another of the one of the second end of the third jury strut or the second end of the fourth jury strut is spaced apart from the second chord in the span wise direction along the wing, the first end of the third jury strut and the first end of the fourth jury strut are spaced apart a first distance from one another in a direction of the chord and the second end of the third jury strut and the second end of the fourth jury strut are spaced apart a second distance from one another in the direction of the chord, each of the first distance and the second distance is equal to or greater than a width dimension of a rotor of an engine of the aircraft.

* * * * *

UNITED STATES PATENT AND TRADEMARK OFFICE
CERTIFICATE OF CORRECTION

PATENT NO. : 11,254,413 B2
APPLICATION NO. : 16/601245
DATED : February 22, 2022
INVENTOR(S) : Robert Erik Grip et al.

It is certified that error appears in the above-identified patent and that said Letters Patent is hereby corrected as shown below:

In the Claims

Column 13, Line 21, In Claim 11, "system," should be -- system --.

Column 13, Line 32, In Claim 12, "positon" should be -- position --.

Column 13, Line 35, In Claim 12, "positon" should be -- position --.

Signed and Sealed this
Twentieth Day of September, 2022

Katherine Kelly Vidal
*Director of the United States Patent and Trademark Office*